United States Patent [19]

Liu

[11] Patent Number: 4,619,228
[45] Date of Patent: Oct. 28, 1986

[54] AUTOMATIC COMPRESSION RELEASE FOR TWO-CYCLE ENGINE

[75] Inventor: Li-Hsiung Liu, Matthews, N.C.

[73] Assignee: Textron Inc., Providence, R.I.

[21] Appl. No.: 659,840

[22] Filed: Oct. 11, 1984

[51] Int. Cl.[4] .......................... F01L 9/02; F01L 13/08
[52] U.S. Cl. .................................................. 123/182
[58] Field of Search ....................... 123/182, 316, 568; 137/513.5

[56] References Cited

U.S. PATENT DOCUMENTS

| Re. 27,410 | 6/1972 | Anderson et al. | 123/182 |
|---|---|---|---|
| 2,362,838 | 11/1944 | Mallory | 123/182 |
| 2,742,380 | 4/1956 | Peters | 123/182 |
| 3,223,076 | 12/1965 | Isoda | 123/182 |
| 3,399,659 | 9/1968 | Isoda | 123/182 |
| 3,704,988 | 12/1972 | Steele | 123/182 |
| 3,807,562 | 4/1974 | Goda | 137/550 |
| 3,901,272 | 8/1975 | Banners et al. | 137/513.5 |
| 4,267,809 | 5/1981 | Mase et al. | 123/568 X |
| 4,287,866 | 9/1981 | Ikuta et al. | 123/568 |
| 4,426,062 | 1/1984 | Bowron | 251/7 |

FOREIGN PATENT DOCUMENTS 1949541 9/1977 Fed. Rep. of Germany ...... 123/182

Primary Examiner—Willis R. Wolfe, Jr.
Attorney, Agent, or Firm—Cushman, Darby & Cushman

[57] ABSTRACT

Automatic compression release for a two-cycle engine is provided in a simple and effective manner by connecting a chamber defined by a diaphragm to the crankcase of the engine with a fluid flow path defining structure. In the fluid flow path, a check valve and orifice are disposed in parallel. The check valve, for example, a duckbill valve, allows the flow of fluid from the diaphragm chamber to the crankcase but not vice versa, and fluid can bleed through the orifice in either direction. The diaphragm operatively engages a valve stem, and a first spring biases the valve stem so that the valve is in open position. A second spring biases the valve to the closed position, and when the first spring is neutralized by a vacuum drawn in the diaphragm chamber, the valve will close. The valve is in communication with a pressure relief opening at an end of the engine cylinder opposite the crankcase.

18 Claims, 7 Drawing Figures

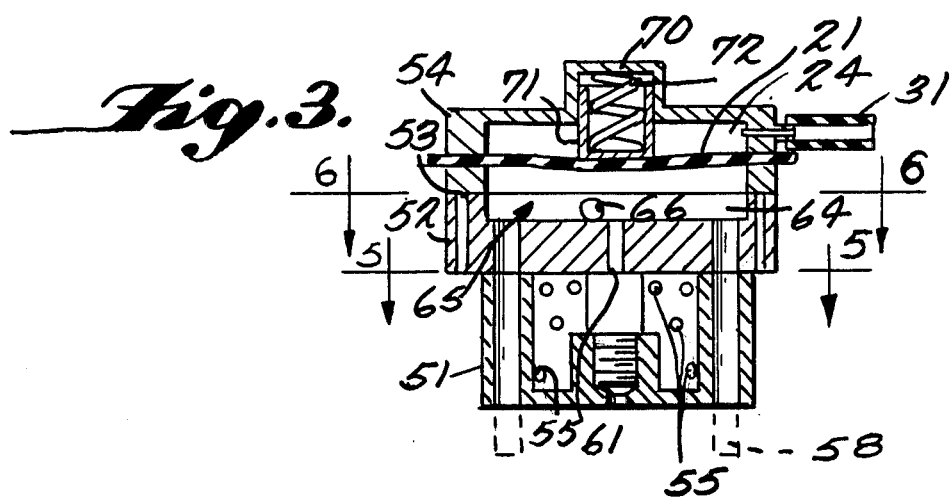
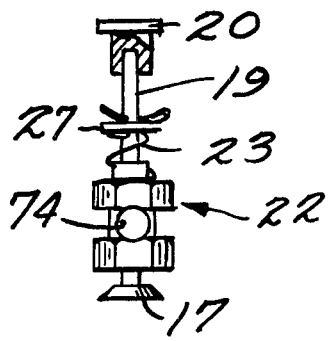
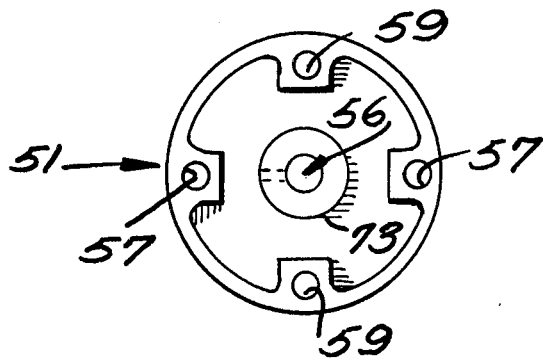
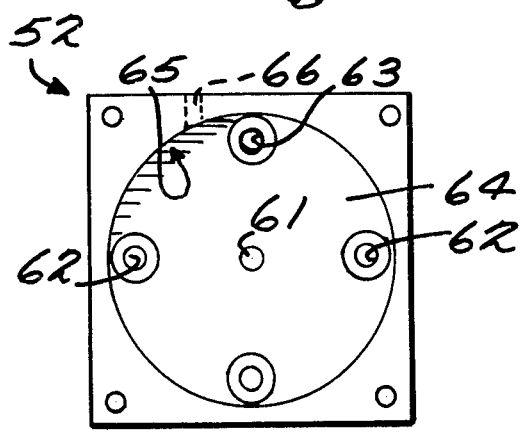
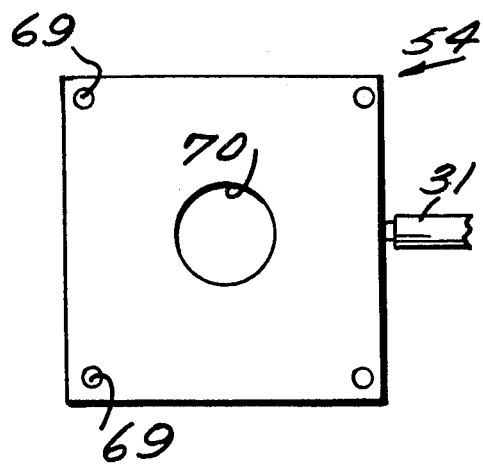

0
AUTOMATIC COMPRESSION RELEASE FOR TWO-CYCLE ENGINE

BACKGROUND AND SUMMARY OF THE INVENTION

The invention relates to a valve and actuator assembly including particularly simple and advantageous acutating components. The valve and actuator assembly is primarily useful in association with an automatic compression release system for a two-cycle engine, and the invention also contemplates a method of effecting start-up and running of a two-cycle internal combustion engine in a particularly effective manner. As is well known in the art, it is necessary to provide pressure relief in a cylinder of a two-cycle engine during start-up, in order to allow the easiest starting possible. According to the present invention, this compression release is effected in a simple, energy efficient, and reliable manner.

A two-cycle engine, such as a lawn mower engine, includes a cylinder wall with a piston movable (i.e., reciprocal) within the cylinder wall. A crankcase is disposed at a first end of the cylinder wall, and a compression release opening disposed at a second end of the cylinder wall, opposite the first end. The compression release opening is located at approximately 20-30% of the piston stroke from top center.

According to the present invention, a conventional compression release valve assembly is mounted in operative association with the compression release opening. This assembly includes a valve body, a stationary valve seat, a valve actuator stem integral with the valve body, a pressure responsive element (preferably a diaphragm) defining a first chamber and operatively engaging the valve stem, and spring biasing means for biasing the valve body to an open position with respect to the valve seat. According to the present invention, means defining a fluid flow path are provided between the first chamber and a source of vacuum or pressure. Preferably the source of vacuum or pressure is the crankcase.

The means defining the fluid flow path from the diaphragm first chamber to the crankcase includes a one-way valve means (i.e., check valve) which allows flow of fluid from the diaphragm chamber to the crankcase but not vice versa, and an orifice which allows bleeding of fluid in both directions between the diaphragm chamber and the crankcase. The check valve and the orifice are disposed in fluid parallel relationship so that fluid must flow through one or the other between the diaphragm chamber and the crankcase. Preferably the orifice and check valve are disposed in a single fluid element which is mounted within a housing, with hose sections connected to fittings for the housing, the hose sections connecting the housing up to the crankcase and the diaphragm chamber. In this way, the fluid flow path defining structures according to the present invention may be readily retrofit to existing two-cycle engines, as well as being readily replaceable, or removable for inspection and repair.

According to the method of the present invention, easy start-up of a two-cycle engine is provided. The method comprises the steps of: (a) At start-up, providing for the exhaust of fluid from the cylinder through the pressure relief opening, ultimately to be exhausted to the atmosphere. (b) After start-up when the piston is moving at operating speed within the cylinder, providing quick exhaust of fluid from the first chamber of the pressure responsive element, so that the valve moves to a closed position and prevents exhaust of fluid from the cylinder. And, (c) upon stopping of the engine, providing for slow bleed back of fluid to the first chamber so that the valve ultimately returns to an open position. Steps (b) and (c) are preferably accomplished by connecting up the first chamber to the crankcase and providing the check valve and orifice in parallel in a fluid flow path between the crankcase and first chamber.

It is the primary object of the present invention to provide a simple and effective apparatus and method which are particularly adapted for effecting easy start-up—in a reliable manner—of a two-cycle internal combustion engine. This and other objects of the present invention will become clear from an inspection of the detailed description of the drawings, and from the appended claims.

BRIEF DESCRIPTION OF THE DRAWINGS

FIG. 3 is a cross-sectional detail view of selective components of the compression release valve means of the apparatus of FIG. 1;

FIG. 4 is a side view of other compression release valve components, cooperable with the components of FIG. 3;

FIG. 5 is a plan view of the bottom component of the structure of FIG. 3, taken along lines 5—5 thereof;

FIG. 6 is a plan view of an intermediate component of the structure of FIG. 3 taken at lines 6—6 thereof; and FIG. 7 is a top plan view of the structure of FIG. 3.

DETAILED DESCRIPTION OF THE DRAWINGS

Figure 1:
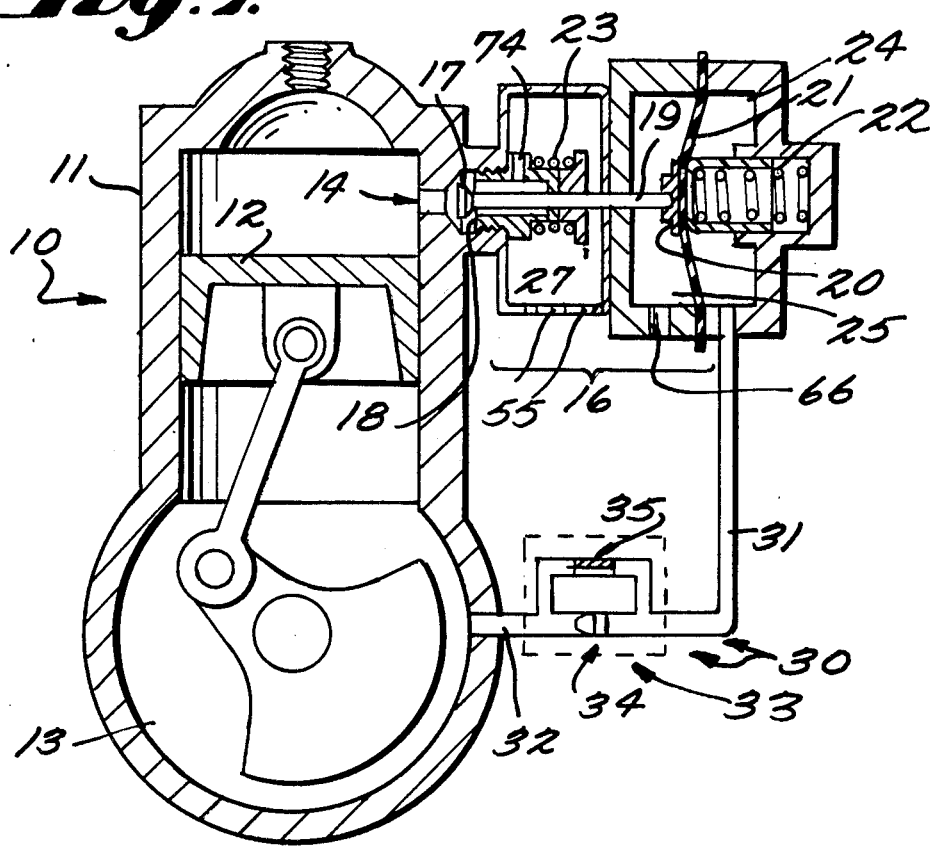
FIG. 1 is a schematic cross-sectional view of exemplary valve actuating components according to the present invention, and in operative association with a cylinder of a two-cycle engine.

A two-cycle internal combustion engine, such as a lawn mower engine, is illustrated schematically by reference numeral 10 in FIG. 1. The engine includes a cylinder wall 11 with a piston 12 reciprocal therein, and crankcase 13 formed at a first end of the cylinder wall 11, and means defining a compression release opening 14 at a second end of the wall 11, opposite the first end 13. The compression release opening 14 is located at approximately 20-30% of the piston 12 stroke from top center.

In FIG. 1, a conventional compression release valve assembly, shown generally by reference numeral 16, is schematically shown operatively connected to the opening 14. The valve assembly 16 includes a valve body 17, a valve seat 18, a valve actuator stem 19 having a cap 20 at the end thereof opposite the body 17, integral with the body 17, a fluid pressure responsive element 21, and spring biasing means 22, 23. The pressure responsive element 21 preferably comprises a diaphragm, which defines a first fluid chamber 24, and a second fluid chamber 25. The diaphragm 21 acts through the cap 20 on the valve stem 18. The first spring 22 (preferably a coil spring) has sufficient strength so that acting through the diaphragm 21 on the valve stem 19 it moves the valve body 17 to the valve open position (body 17 displaced from seat 18) illustrated in FIG. 1. The second spring 23, which also preferably comprises a coil spring, is weaker than the spring 22, and acts on stem 19 through collar 27 to bias the body 17 to the closed position (i.e., in sealing engagement with the valve seat 18).

According to the present invention, means 30 are provided defining a fluid flow path between the first chamber 24 and a source of vacuum or pressure. Preferably the source of vacuum or pressure is the crankcase 13. The flow path defining means 30 preferably comprises hose sections 31, 32, and fluid component assembly 33. The fluid component assembly 33 includes a one-way valve means 34 and an orifice means 35. The one-way valve means 34 allows fluid to pass from the chamber 24 to the crankcase 13, but not vice versa. The orifice means 35 allows fluid to bleed from the chamber 24 to the crankcase 13 and vice versa. Components 34 and 35 are connected in fluid parallel relationship.

Figure 2:
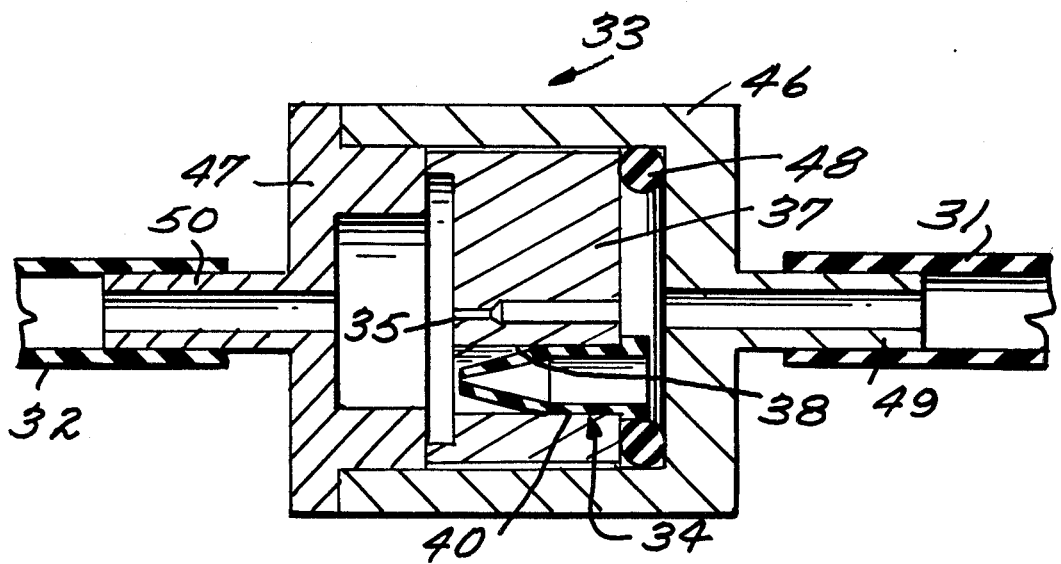
FIG. 2 is a detail cross-sectional view of an exemplary fluid flow path defining means of the apparatus of FIG. 1.

A typical simple construction of the fluid elements 33 is shown in detail in FIG. 2. Structure 33 as illustrated in FIG. 2 includes a fluid element 37 which has two bores therein. The first bore defines the orifice 35, and the second bore 38, much larger that the first bore, is for receipt of the one-way valve means 34. The orifice 35 may have any dimension that provides for proper operation of the assembly. A typical dimension of the orifice 35 is a diameter of approximately 0.014 inches.

The one-way valve means 34 illustrated in FIG. 2 preferably is a conventional check valve. The valve 34 may comprise any type of check valve that is responsive enough to the pressure conditions that it will be subjected to so that it works properly. A typical check valve that is useful comprises a duckbill valve, such as shown in U.S. Pat. Nos. 3,807,562 and 4,426,062, and as shown schematically in FIGS. 1 and 2 at 40. Valve element 40 allows fluid to flow from line 31 to line 32, but not vice versa.

The structure 33 illustrated in FIG. 2, in addition to the fluid component 37, also preferably comprises a female housing section 46 and a male housing section 47. The sections 46, 47 cooperate as illustrated in FIG. 2. An O-ring 48, or other sealing means, is disposed between the element 37 and the housing section 36 to ensure that fluid flowing through the member 33 must flow through either the orifice 35 or the valve means 34. The housing sections 46, 47 have hollow fittings 49, 50, respectively, which receive the hose sections 31, 32, respectively. The hose section 31 is fitted, at the end thereof opposite the assembly 33, to a fitting associated with the first chamber 24, and the hose section 32 is fitted at an end thereof opposite the fitting 50 to a fitting connected to the crankcase 13.

If desired, a duckbill valve having controlled flow characteristics in the normal no-flow direction (such as shown in U.S. Pat. No. 3,901,272) may be utilized in place of valve 34 and orifice 35.

Typical components that may be utilized for the valve assembly 16 are shown in more detail in FIGS. 3 through 7. As illustrated in FIG. 3, preferably four separable components, besides the diaphragm 21, may be provided. These components are indicated by reference numerals 51, 52, 53, and 54 in FIG. 3.

The component 51 preferably comprises a silencer housing, being a generally cylindrical component having a plurality of openings 55 formed in the wall thereof, and a central bore 56 in which the valve body 17 reciprocates. A pair of first peripheral bores 57 are provided which are adapted to receive bolts (shown by dotted line at 58 in FIG. 3) which attach the housing component 52 to the member 51, and additionally attach the member 51 to the cylinder wall 11 at the compression release opening 14. A second pair of peripheral bores 59, which receive bolts (not shown) attaching the housing components 51, 52 together, are also provided.

The housing component 52, illustrated in FIGS. 3 and 6, includes a central bore 61 therein for receipt of the valve stem 19. The bores 62 are in alignment with the bores 57 and receive the bolts 58, and the bores 63 are in alignment with the bores 59 to receive another set of bolts. The recessed central portion 64 includes a side wall 65 in which a bore 66 is formed, the bore 66 allowing free communication between the recessed portion 64 and the atmosphere. The peripheral bores 68 are adapted to receive screw fasteners (not shown), or the like, for connecting the components 54, 53, 52 together.

The diaphragm 21, of rubber or like material, is sandwiched between the housing components 53, 54, and rigidly attached thereto around the peripheral interengaging portions. The first chamber 24 is disposed between the diaphragm 21 and the top and walls of the housing section 54. Bores 69 formed in the section 54 cooperate with the bores 68 of the section 52 to receive screw fasteners or the like for attaching the components together. The central hat-shaped portion 70 of the housing component 54 receives the coil spring 22, which is surrounded by slide member 71 (see FIG. 3) and acts on the diaphragm 21 to bias the central portion thereof toward the housing components 51, 52.

The valve elements for the structure of FIG. 3 are illustrated in FIG. 4, including the valve stem 19, cap 20 (which is removably attached to the end of stem 19), and valve body 17 which is integral with the valve stem 19. A generally spool-shaped structure 72, is mounted to the nipple 73 (see FIG. 3) of the element 51, and the second spring 23 acts between the top of the spool 72 and the collar 27 which is rigidly attached (as by a cotter pin—not shown) to the valve stem 19. Opening 74 in spool 72 (see opening 74 in FIG. 1 too) allows for the exhausting of fluid from the opening 56 into the silencer 51 and through the openings 55. When the elements of FIG. 4 are assembled in the structure of FIG. 3, all of the components thereof except for the valve stem 19 will be within the silencer 51. The valve stem 19 will extend through the central bore 61 in member 52, and into the recessed area 64. In the recessed area 64 (which defines the second chamber 25), the cap 20 is placed on the stem 19, and engages the diaphragm 21 opposite the slide 71.

In the practice of the method of the present invention to effect start-up of the two-cycle internal combustion engine, the following takes place:

As the engine is fired, the piston 12 reciprocates within the cylinder wall 11. At start-up the cranking speed is relatively small so that a large pulsating vacuum is not caused in the crankcase 13. In this condition, the spring 22 has sufficient strength to overcome the spring 23 so that spring 22—acting through diaphragm a 21—biases the valve stem 19 so that the valve body 17 is spaced from the seat 18, and thus the pressure relief valve is in the open position. This allows some of the fluid at the top of the cylinder 12 to exhaust through the opening 14, between the valve body 17 and seat 18, through opening 74, into housing member 51, and through silencer openings 55 to the atmosphere.

Once the engine 10 has started and achieves a normal operating speed, a pulsating vacuum is formed in crankcase 13. This vacuum causes gas in the chamber 24 to be quickly exhausted therefrom through hose section 31, check valve 34, and hose section 32 into the crankcase 13. Quickly the pressure in chamber 24 is reduced to a vacuum condition. The vacuum in chamber 24 causes the atmospheric pressure in chamber 25 to act on the diaphragm 21 to cause it to move to the right in FIG. 1. Thus, the bias of spring 22 is overcome, and the spring 23 thus controls operation of the valve actuator stem 19, causing the stem 19 to move to the right in FIG. 1 so that the valve body 17 moves into sealing relationship with the valve seat 18. No gas may then be exhausted through opening 14.

Because of the check valve 34, the pulsating vacuum in crankcase 13 is essentially a continuous vacuum since when a pressure condition is reached in crankcase 13 no gas can flow through check valve 34. The only gas that can flow is a small amount which bleeds through orifice 35, and which is insufficient—while the engine 10 is running—to significantly affect the pressure conditions in the chamber 24.

Once the engine 10 has stopped running, an atmospheric or like pressure condition is achieved in the crankcase 13. Gas then bleeds from crankcase 13 through orifice 35 to the chamber 24, ultimately restoring pressure to the chamber 24 so that the pressure in chambers 24, 25 is approximately equal. In this condition, the spring 22 will again overpower the spring 23 and move the valve body 17 to the open position so that the structure is ready for another start-up.

Plugging of the orifice 35 is not a problem due to the fact that it is in a clean environment, and also since there is a pulsating gas flow therethrough, which will effect cleaning.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. An automatic compression release assembly for a two-cycle engine including a cylinder wall, a piston movable within said cylinder wall, a crankcase formed at a first end of said cylinder wall, and means defining a compression release opening at a second end of said cylinder wall, opposite said first end;

a stationary valve seat operatively connected to said means defining said pressure relief opening, and a movable valve body movable toward and away from said valve seat to selectively allow fluid to flow through said compression release opening and past said valve seat to be exhausted, and to prevent fluid from being exhausted through said pressure relief opening;

a valve actuator member operatively connected to said valve body;

said pressure responsive member defining a first chamber, said pressure responsive member operatively connected to said valve actuator member;

spring biasing means for biasing said actuator member so that said valve body is normally displaced from said valve seat to allow exhausting of fluid through said pressure relief opening; and means defining a fluid flow path between said crankcase and said first chamber, said means including a valve means wherein said fluid pressure responsive member comprises a diaphragm, and wherein said actuating member comprises a valve stem integral with said valve body; and further comprising a cap disposed on said valve stem, said cap engaging said diaphragm; and wherein said spring biasing means comprises a first spring disposed in said first chamber and acting on said diaphragm and through said diaphragm on said valve stem to move said valve body to a displaced position with respect to said valve seat, and a second spring having less strength than said first spring, said second spring acting on said valve stem to move said valve body into closed, sealing, relationship with respect to said valve seat.

2. A valve and actuator assembly comprising:
a movable valve body, a stationary valve seat, and an actuator member connected to said body;
said fluid pressure responsive member defining a first chamber, said fluid pressure responsive member operatively engaging said actuator member;
spring biasing means for biasing said valve body so that normally it is displaced from said valve seat to allow fluid passage therethrough; and
means defining a fluid flow path from said first chamber to a source of pressure, said means including: a one-way valve means for providing for the passage of fluid from said first chamber to said source, but not vice versa; and orifice means for providing for the bleeding of fluid between said source and said first chamber in either direction; said orifice means and said one-way valve means being connected in fluid parallel relationship between said source and said first chamber wherein said means defining said flow path comprises:
a fluid element disposed within a housing, said fluid element having means defining first and second parallel bores therein, the first bore defining said orifice means, the second bore, larger than said first bore, defining a means for receipt of a check valve and a second hose section for connecting said housing to said source wherein said housing comprises:
a first, hollow, male element;
a second, hollow, female element in engagement with said male element with said fluid element disposed between said male and female elements; and
sealing means disposed between said fluid element and one of said male and female elements has a fitting with a hollow passageway therein, each said fitting receiving one of said hose sections.

3. An assembly as recited in claim 2 wherein said sealing means is disposed between said fluid element and said female housing portion, and wherein said fitting of said female housing portion receives said hose section connected to said first chamber.

4. A method of effecting start-up and operation of a two-cycle internal combustion engine having a cylinder wall having first and second ends, a piston movable within said cylinder wall, a crankcase formed at a first end of the cylinder wall, and a pressure relief opening at the second end of the cylinder wall opposite the first end, and a valve actuated by a pressure responsive element including a first chamber, the valve disposed in operative association with the pressure relief opening; said method comprising the steps of:

(a) at start-up, providing an exhaust of fluid from the cylinder through the pressure relief opening, ultimately to be exhausted to the atmosphere;

(b) after start-up, when the piston is moving at operating speed within the cylinder, providing quick exhaust of fluid from the first chamber of the pressure responsive element, so that the valve moves to a closed position and prevents exhaust of fluid from the cylinder; and (c) upon stopping of the engine, providing slow bleed back of fluid to the first chamber so that the valve ultimately returns to an open position.

5. A method as recited in claim 4 wherein steps (b) and (c) are accomplished by operatively connecting the first chamber to the crankcase.

6. A method as recited in claim 5 wherein steps (b) and (c) are further practiced by providing a structure connected between the first chamber and the crankcase so that fluid can flow freely from the first chamber to the crankcase, but not vice versa, and can bleed from the crankcase to the chamber.

7. A valve and actuator assembly comprising:
a movable valve body, a stationary valve seat, and an actuator member connected to said body;
a fluid pressure responsive member defining first a chamber, said fluid pressure responsive member operatively engagaging said actuator member;
spring biasing means for biasing said valve body so that normally it is displaced from said valve seat to allow fluid passage therethrough; and
means defining a fluid flow path from said first chamber to a source of pressure, said means including: a one-way valve means for providing for the passage of fluid from said first chamber to said source, but not vice versa; and orifice means for providing for the bleeding of fluid between said source and said first chamber in either direction; said orifice means and said one-way valve means being connected in fluid parallel relationship between said source and said first chamber; said fluid pressure responsive member comprising a diaphragm, and wherein said actuating member comprises a valve stem integral with said valve body; and further comprising a cap disposed on said valve stem, said cap engaging said diaphragm; and wherein said spring biasing means comprises a first spring disposed in said first chamber and acting on said diaphragm and through said diaphragm on said valve stem to move said valve body to a displaced position with respect to said valve seat, and a second spring having less strength than said first spring, said second spring acting on said valve stem to move said valve body into closed, sealing, relationship with respect to said valve seat.

8. An assembly as recited in claim 7 wherein said means defining said flow path comprises: a fluid element disposed within a housing, said fluid element having means defining first and second parallel bores therein, the first bore defining said orifice means, the second bore, larger than said first bore, defining a means for receipt of a check valve; and a hose, comprising a first hose section for connecting said housing to said first chamber, and a second hose section for connecting said housing to said source.

9. An assembly as recited in claim 7 wherein said diaphragm is mounted in a housing portion and defines a second chamber in said housing portion, opposite said first chamber, said second chamber being in free communication with atmosphere.

10. An assembly as recited in claim 7 wherein said valve seat is disposed in operative association with a silencer housing so that fluid passing between said valve body and said valve seat entering said silencer body passes through perforations formed in said silencer body; and wherein said second spring is disposed in said silencer body and operatively acts between a stationary component inside said silencer body and a collar rigidly mounted to said valve stem between said cap and said valve body.

11. An assembly as recited in claim 10 wherein said diaphragm is mounted in a housing portion and defines a second chamber in said housing portion, opposite said first chamber, said second chamber being in free communication with atmosphere; said diaphragm containing housing releasably mounted to said silencer so that said valve stem extends through said silencer housing into said diaphragm housing second chamber.

12. An automatic compression release assembly for a two-cycle engine including a cylinder wall, a piston movable within said cylinder wall, a crankcase formed at a first end of said cylinder wall, and means defining a compression release opening at a second end of said cylinder wall, opposite said first end:
a stationary valve seat operatively connected to said means defining said pressure relief opening, and a movable valve body movable toward and away from said valve seat to selectively allow fluid to flow through said compression release opening and past said valve seat to be exhausted, and to prevent fluid from being exhausted through said pressure relief opening;
a valve actuator member operatively connected to said valve body;
said pressure responsive member defining a first chamber, said pressure responsive member operatively connected to said valve actuator member;
spring biasing means for biasing said actuator member so that said valve body is normally displaced from said valve seat to allow exhausting of fluid through said pressure relief opening; and
means defining a fluid flow path between said crankcase and said first chamber, said means including a valve means wherein said means defining a flow path between said crankcase and said first chamber comprises means for allowing free flow of fluid from said first chamber to said crankcase but not vice versa, and for allowing bleeding of fluid from said crankcase to said first chamber.

13. An assembly as recited in claim 12 wherein said valve means of said means defining said fluid flow path comprises a one-way valve means for providing passage of fluid from said first chamber to said crankcase, but not vice versa; and wherein said means defining said fluid flow path further comprises orifice means for allowing bleeding of fluid in either direction between said first chamber and said crankcase, said orifice means being disposed in fluid parallel relationship with said one-way valve means so that fluid flowing between said first chamber and said crankcase, and vice versa, must pass through either said orifice means or said one-way valve means.

14. An assembly as recited in claim 13 wherein said means defining said flow path comprises a fluid element disposed within a housing, said fluid element having means defining first and second parallel bores therein, the first bore defining said orifice means, the second bore, larger than said first bore, defining a means for receipt of a check valve; and a hose, comprising a first hose section for connecting said housing to said first chamber, and a second hose section for connecting said housing to said source.

15. An assembly as recited in claim 14 wherein said housing comprises a first, hollow, male element; a second, hollow, female element in engagement with said male element with said fluid element disposed between said male and female elements; and sealing means disposed between said fluid element and one of said male and female elements; and wherein each of said male and female elements has a fitting with a hollow passageway therein, each said fitting receiving one of said hose sections.

16. An assembly as recited in claim 14 wherein said fluid pressure responsive member comprises a diaphragm, and wherein said actuating member comprises a valve stem integral with said valve body; and further comprising a cap disposed on said valve stem, said cap engaging said diaphragm; and wherein said spring biasing means comprises a first spring disposed in said first chamber and acting on said diaphragm and through said diaphragm on said valve stem to move said valve body to a displaced position with respect to said valve seat, and a second spring having less strength than said first spring, said second spring acting on said valve stem to move said valve body into closed, sealing, relationship with respect to said valve seat.

17. An assembly as recited in claim 16 wherein said valve seat is disposed in operative association with a silencer housing so that fluid passing between said valve body and said valve seat entering said silencer body passes through perforations formed in said silencer body; and wherein said second spring is disposed in said silencer body and operatively acts between a stationary component inside said silencer body and a collar rigidly mounted to said valve stem between said cap and said valve body.

18. An assembly as recited in claim 16 wherein said diaphragm is mounted in a housing portion and defines a second chamber in said housing portion, opposite said first chamber, said second chamber being in free communication with atmosphere.

* * * * *